US007630586B2

(12) United States Patent
Yasukaga et al.

(10) Patent No.: US 7,630,586 B2
(45) Date of Patent: Dec. 8, 2009

(54) IMAGE PROCESSING APPARATUS AND IMAGE PROCESSING SYSTEM

(75) Inventors: Masayuki Yasukaga, Tokyo (JP); Tomohiro Suzuki, Tokyo (JP); Yuji Tamura, Tokyo (JP); Tetsuya Ishikawa, Tokyo (JP); Hiroyasu Nishimura, Tokyo (JP); Tomoya Ogawa, Tokyo (JP); Fumikage Uchida, Asaka (JP); Nao Moromizato, Tokyo (JP); Munetoshi Eguchi, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 721 days.

(21) Appl. No.: 11/254,865

(22) Filed: Oct. 21, 2005

(65) Prior Publication Data
US 2006/0282466 A1 Dec. 14, 2006

(30) Foreign Application Priority Data
Jun. 9, 2005 (JP) ............................. 2005-169847

(51) Int. Cl.
G06K 9/54 (2006.01)
G06F 7/00 (2006.01)
(52) U.S. Cl. .................................. 382/305; 707/104.1
(58) Field of Classification Search .............. 382/305, 382/306, 100; 705/1, 67, 26; 709/224; 707/104.1
See application file for complete search history.

(56) References Cited

U.S. PATENT DOCUMENTS

| 7,222,134 | B1 | 5/2007 | Maruyama et al. |
| 7,366,702 | B2 * | 4/2008 | David .......................... 705/67 |
| 2002/0010679 | A1 * | 1/2002 | Felsher ....................... 705/51 |
| 2002/0026372 | A1 * | 2/2002 | Katsuta ....................... 705/26 |
| 2006/0184658 | A1 * | 8/2006 | Riddell ....................... 709/224 |

FOREIGN PATENT DOCUMENTS

| JP | 6-62146 | 3/1994 |
| JP | 10-42114 | 2/1998 |
| JP | 11-120204 | 4/1999 |
| JP | 11-184777 | 7/1999 |
| JP | 2000-172720 | 6/2000 |
| JP | 2001-249929 | 9/2001 |
| JP | 2001-306204 | 11/2001 |
| JP | 2004-15629 | 1/2004 |
| JP | 2004-185423 | 7/2004 |
| JP | 2005-20223 | 1/2005 |

OTHER PUBLICATIONS

Office Action in JP 2005-169847 dated Mar. 12, 2009, and an English Translation thereof.
Office Action in JP 2005-169847 dated May 28, 2009, and an English Translation thereof.

* cited by examiner

*Primary Examiner*—Yon Couso
(74) *Attorney, Agent, or Firm*—Buchanan Ingersoll & Rooney PC

(57) ABSTRACT

An image processing apparatus comprises an input section which inputs a user identification information; and a registration section which registers an image data in association with the user identification information.

12 Claims, 11 Drawing Sheets

FIG. 7

| JOB NUMBER | IMAGE DATA STORAGE LOCATION | OUTPUT DESTINATION USER NAME (RECIPIENT IDENTIFICATION INFORMATION) | FILE NAME |
|---|---|---|---|
| 00001 | MFP1¥BOX10 | FUJII | help.doc |
| 00002 | MFP1¥BOX02 | matsuzaka | format.pdf |
| 00003 | MFP2¥BOX22 | FUJII | data.xls |
| 00004 | MFP3¥BOX08 | ENDO | memo.txt |
| ⋮ | ⋮ | ⋮ | ⋮ |

IMAGE PROCESSING APPARATUS AND IMAGE PROCESSING SYSTEM

RELATED APPLICATION

This application is based on patent application No. 2005-169847 filed in Japan, the entire content of which is here incorporated by reference.

BACKGROUND

1. Field of the Invention

The present invention relates to image processing apparatuses, image output apparatuses and image processing systems, in particular to technology related to registration and search of image data.

2. Description of the Related Art

An image processing apparatus such as a digital multi-function peripheral (MFP) has the copy function of forming the image on the recording sheet corresponding to the image data that has been read out from the original document, the print function of forming the image on the recording sheet corresponding to the print data, the facsimile function of transmitting and receiving image data, and the transfer function of transferring image data. Further, in addition to these functions, there are also apparatuses that have the function of accumulating and storing a large volume of image data in a recording medium such as a hard disk drive (HDD), etc.

At the time of such storing of large volumes of data, in order to ease the search and management of images and to protect from unauthorized viewing of the data by other persons, measures are taken such as providing separate storage areas (storage boxes) for different users or different groups and storing the image data after classifying it in these storage boxes. For example, there are document management apparatuses in which for every image data that has been read out, the users who are permitted to output that data are specified and only those users are allowed to search for and read out the image from the storage boxes (see, for example, Patent Document 1).

Patent Document 1: Japanese Unexamined Patent Application Laid Open No. 2001-249929.

In a system in which a plurality of image processing apparatuses have been connected to the network, since a number of storage boxes will be present distributed over these plural image processing apparatuses, when handing over image data via storage boxes to a person other than the person who stored it, it was not possible for the recipient to take out the desired image data unless the recipient knew in which storage box of which terminal has been the image data stored. Therefore, it was inconvenient because either the recipient had to obtain separately from the person storing the image data the information related to the storage location such as the device name or storage box name of the storage location or to search a number of storage boxes.

In addition, even when the recipient could come to know the storage location of the desired image data, there was the problem that, in order to take out that image data from the storage box, it was necessary to go up to the corresponding device, input the storage box name in its operating panel, and also to carry out complicated operations such as selecting the file name, etc.

SUMMARY

In view of foregoing, an object of this invention is to solve at least one of the problems, and to provide a new image processing apparatus, a new image output apparatus or an image processing system. The image processing apparatus comprises an input section which inputs a user identification information; and a registration section which registers an image data in association with the user identification information.

Another aspect of the invention is to provide an image output apparatus connected to a network comprises a search information input section which inputs a user identification information for search; a search section which searches an image data, stored in an external device, based on the user identification information inputted in the search information input section; and an image data output section which obtains and outputs the image data searched by the search section.

Another aspect of the invention is to provide an image processing apparatus comprises a job registration section which registers an image data in each job; a recipient information input section which inputs a recipient identification information representing a recipient for the image data; a job management section which manages the recipient identification information in association with a storage location for the image data in each registered job; a search information receiving section which receives a recipient identification information for search from an external device connected to a network; a search section which searches an image data associated with the recipient identification information matching the recipient identification information for the search; a search result output section which outputs a predetermined item with regard to the image data searched by the search section; and an image data output section which outputs the image data in accordance with an output instruction from an external device.

Another aspect of the invention is to provide an image processing system comprises a first image processing apparatus, and a second image processing apparatus, wherein the first image processing apparatus and the second image processing apparatus are connected with each other via a network, wherein the first image processing apparatus includes a job registration section which registers an image data in each job; a recipient information input section which inputs a recipient identification information representing a recipient for the image data; and a job management section which manages the recipient identification information in association with a storage location for the image data in each registered job, wherein the second image processing apparatus includes a search information input section which inputs a user identification information for search; and a search instruction transmitting section which transmits a search instruction including the recipient identification information for search to the first image processing apparatus, wherein the first image processing apparatus further includes a search information receiving section which receives the search instruction from the second image processing apparatus; a search section which searches an image data associated with the recipient identification information matching the recipient identification information for the search in the search instruction; and a search result output section which outputs a predetermined item with regard to the image data searched by the search section in response to the search instruction, wherein the second image processing apparatus further includes an output instruction transmitting section which selects the image data based on the predetermined item received from the first image processing apparatus, and transmits a output instruction with regard to a selected image data to the first image processing apparatus, wherein the first image processing apparatus further includes an image data output section which outputs the image data in accordance with the output instruction from the second image processing apparatus.

Further, another aspect of the invention is to provide an image processing system comprises a first image processing apparatus, and a second image processing apparatus, wherein the first image processing apparatus and the second image processing apparatus are connected with each other via a network, wherein the first image processing apparatus includes a job registration section which registers an image data in each job; a recipient information input section which inputs a recipient identification information representing a recipient for the image data; and a job management section which manages the recipient identification information in association with a storage location for the image data in each registered job, wherein the second image processing apparatus includes a search information input section which inputs a user identification information for search; and a search instruction transmitting section which transmits a search instruction including the recipient identification information for search to the first image processing apparatus, wherein the first image processing apparatus further includes a search information receiving section which receives the search instruction from the second image processing apparatus; a search section which searches an image data associated with the recipient identification information matching the recipient identification information for the search in the search instruction; and an image data output section which outputs the image data searched by the search section.

The invention itself, together with further objects and attendant advantages, will best be understood by reference to the following detailed description taken in conjunction with the accompanying drawings.

BRIEF DESCRIPTION OF THE DRAWINGS

FIG. 7: This is an explanatory diagram showing an example of the control table managing the image data in the image processing apparatus.

In the following description, like parts are designated by like reference numbers throughout the different drawings.

DESCRIPTION OF THE PREFERRED EMBODIMENT

Figure 1:
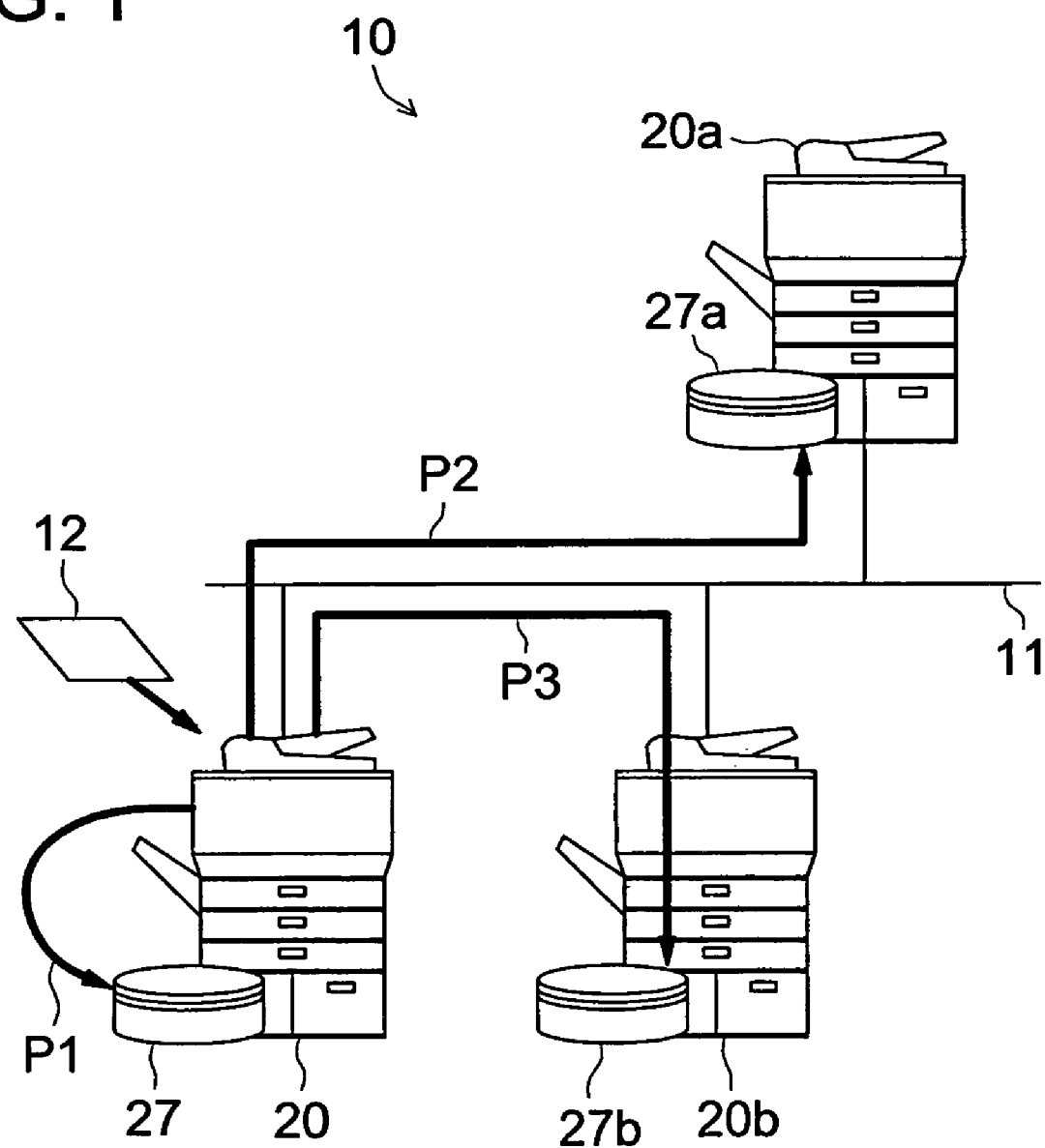
FIG. 1: This is an explanatory diagram showing the configuration of the image processing system including the image processing apparatus according to a preferred embodiment of the present invention and the flow of processing in that image processing system.

The preferred embodiments of the present invention are described below referring to the drawings.

FIG. 1 is a figure for explaining the configuration of the image processing system 10 including a multi-function peripheral (MFP) as the image processing apparatus 20 according to a preferred embodiment of the present invention and the flow of image data in that image processing system 10.

In the image processing system 10 is configured by connecting a plurality of image processing apparatuses 20, 20a, and 20b to a network 11 such as a LAN (Local Area Network). Although the mechanical constructions of the image processing apparatuses 20, 20a, and 20b are all identical, the image processing apparatus 20 carries out the role of the first image processing apparatus that performs registration of image data in the image processing system 10, and the image processing apparatuses 20a and 20b carry out the roles of the second image processing apparatus that perform instruction of searching for image data.

Each of the image processing apparatuses 20, 20a, and 20b comprises, respectively, an image storage section 27, 27a, and 27b. In the image processing apparatus 20, it is possible to store the image data obtained by reading in the original document 12 while specifying the recipient for that image data. The image data is either stored in the image storage section 27 of the same apparatus 20 (Path P1) or is stored in the image storage section 27a and 27b of other image processing apparatuses 20a and 20b connected via the network 11 (Path P2, P3). Which of the image storage 27, 27a, and 27b is to be made as the destination for storing the image data is determined, for example, based on a priority order said beforehand or on the free space of the image storage section 27 available by the same apparatus 20.

On the other hand, even if the target image data is stored in any one of the image storage section 27, 27a, and 27b in image processing system 10, the image processing apparatus 20a can search for the corresponding image data without the storage location or the name of the image data etc., if the recipient of that image data is designated. Further, although the image storage section 27, 27a, and 27b are being shown in the figure as being outside the image processing apparatuses 20, 20a, and 20b, in actuality, they are provided within the image processing apparatuses 20, 20a, and 20b. It goes without saying that it is possible to store the image data in an external storage device connected to the image processing apparatuses 20, 20a, and 20b.

Figure 2:
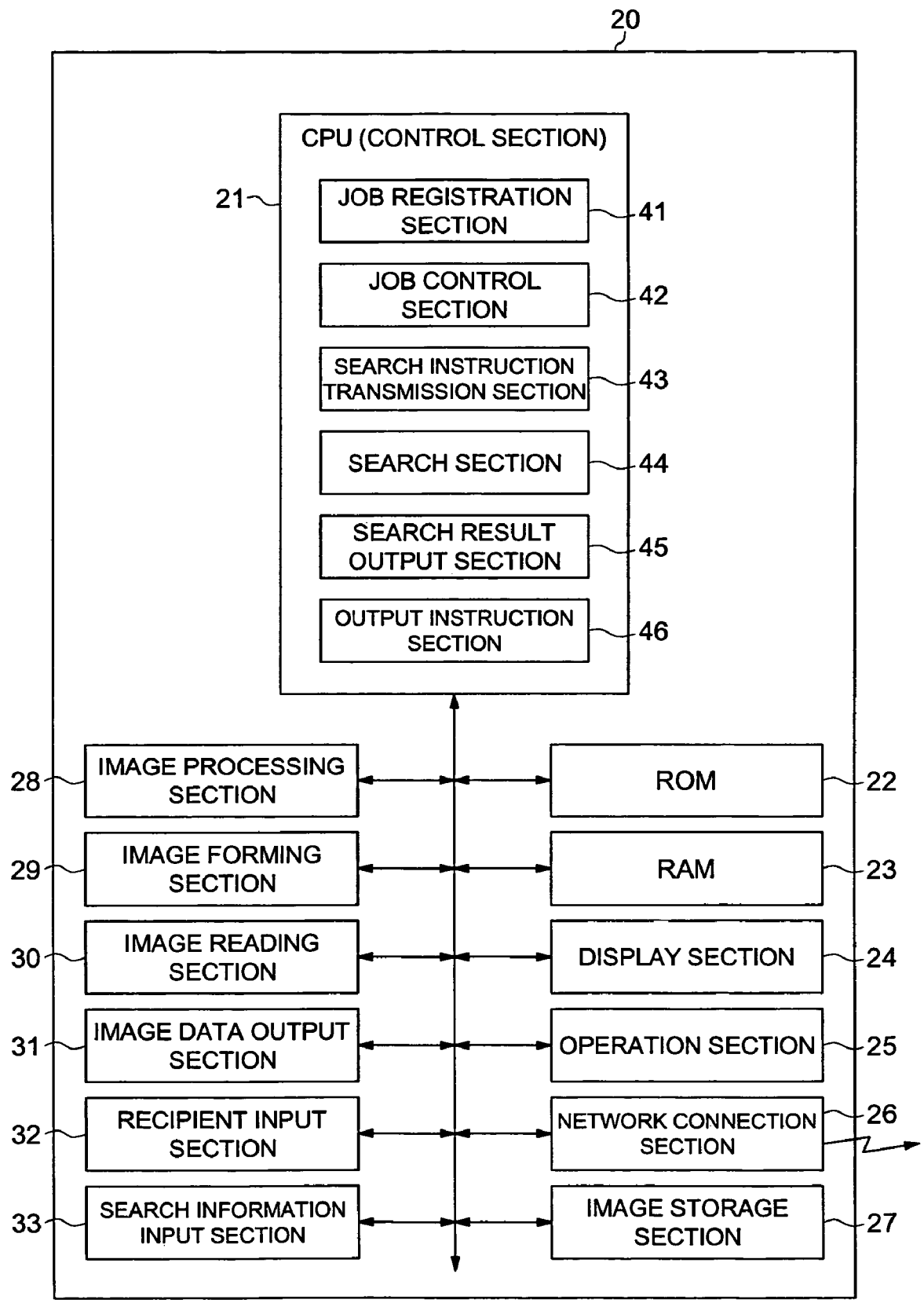
FIG. 2: This is a block diagram showing the configuration of image processing apparatus according to a preferred embodiment of the present invention.

FIG. 2 is a block diagram showing the electrical configuration of image processing apparatus 20 according to a preferred embodiment of the present invention.

The image processing apparatus 20 is configured as a multi-function peripheral (MFP) that has, in addition to the copy function of a copying machine that reads the original document and forms a copy image on the recording paper, the scanner function of reading the original document and outputting the corresponding image data, the print function of printing out the print data received from an external personal computer, etc., the facsimile receiver function of printing based on the image data received from an external facsimile equipment, or the facsimile transmission function of transmitting to an external facsimile equipment the image data obtained by reading the original document.

The image processing apparatus 20 is provided with a CPU (Central Processing Unit) 21 that comprehensively controls the operations of that apparatus. A ROM (Read Only Memory) 22, a RAM (Random Access Memory) 23, a display section 24, an operation section 25, a network connection section 26, an image storage section 27, an image processing section 28, an image forming section 29, an image reading section 30, an image data output section 31, a recipient input section 32, and a search information input section 33 are connected to the CPU 21 via a system bus.

The ROM 22 stores the programs executed by the CPU 21 and various types of fixed data. The RAM 23 has the function of a working storage which temporarily stores various types of data during the execution of programs by the CPU 21 or the function of a page memory that temporarily stores image data.

The display section 24 is configured from a liquid crystal display and has the function of making various types of guidance displays and status displays. The individual operation screens for each of the functions of the facsimile function, copy function, printer function, and scanner function, etc., are displayed selectively in the display section 24.

The operation section 25 is configured using various types of operation switches and a touch panel that covers the display section 24, and has the function of receiving various types of operations made by the user.

The network connection section 26 has the function of carrying out data communication by connecting to a telephone line or to various types of networks. Specifically, it connects to external devices and carries out data communication.

The image storage section 27 is a large capacity storage device for storing compressed image data or print data. A hard disk drive (HDD) is being used here for this purpose.

The image processing section 28 has the functions of enlarging or reducing the image data, compression and decompression of image data, image rotation, etc.

The image forming section 29 has the function of forming an image corresponding to the image data on the recording medium by an electro-photographic process and outputting it. The image forming section 29 is configured as a laser printer having a recording medium transporting device, a photosensitive drum, a charging unit, a laser unit, a developing unit, an image transfer and separation unit, a cleaning unit, and a fixing unit.

The image reading section 30 has the function of reading the image in the original document and taking in the corresponding image data. The image reading section 30 is provided with a light source that illuminates the original document, a line image sensor that leads one line of the original document along its width direction, a moving section that moves the reading position along the longitudinal direction of the document in units of a line, and an optical path comprising lenses and mirrors that guide and focus the reflected light on to the line image sensor. The line image sensor is constituted by a CCD (Charge Coupled Device). The analog image signal output by the line image sensor is A/D (analogue to digital) converted and is taken in as a digital image data.

The image data output section 31 has the function of supplying to the image forming section 29 the image data stored in the image storage section 27 etc., while matching the operation timing of the image forming section 29, and the function of outputting to an external device via the network connection section 26.

The recipient input section 32 has the function of inputting via the operation section 25 the recipient identification information indicating the recipient of the image data at the time of registering the image data input from the image reading section 30 etc.

The search information input section 33 has the role of inputting the recipient identification information used for searching the image data. The input of the recipient identification information (user identification information) is done by entering via the operation section 25 the user name, the user's nickname, the organization name, the designation name, the facial photograph. Further, the search information input section 33 can also be provided with an authentication section. In that case, in addition to the above recipient identification information (user identification information), authentication information such as password or biological information will have to be input from the search information input section 33. The correspondence between the recipient identification information (user identification information) and the authentication input in this case is authenticated based on the registration information related to the user that has been stored in the image processing apparatus 20 or in an external terminal connected via the network.

Further, the recipient identification information can be input, apart from inputting via the operation section 25 of the image processing apparatus 20, using information stored in a media such as an ID card or a wireless tag carried by the user, or information recognized by using the user's fingerprint or facial biometric information, or can be input via the network 11 from the image processing apparatuses 20a, and 20b.

The CPU 21 performs the roles of a job registration section 41, a job management section 42, a search instruction transmission section 43, a searching section 44, a search result output section 45, and an output instruction section 46.

The job registration section 41 carries out the function of registering the image data as a job which is a operation unit of the printing operations or storage operations within the image processing apparatus. Further, it has the function of storing the image data related to the job when the job includes a storage operation for outputting the image data at a later time.

The job management section 42 carries out the function of managing the jobs by establishing the correspondence between the jobs registered by the job registration section 41 and the job attributes information related to those jobs. When a job registered by the job registration section 41 includes a storage operation, the job management section 42 carries out management by registering while establishing correspondence between the recipient identification information input as the job attributes information from the recipient input section 32 and the storage location of the image data related to that job.

The search instruction transmission section 43 has the function of transmitting to the external image processing apparatuses 20a and 20b the search instruction of the image data for which a user entered and authenticated via the search information input section 33 as the recipient (destination). The search instruction here includes at least the recipient identification information (user identification information).

The searching section 44 searches for the image data, according to the search instruction received from the search instruction transmission section 43, as the destination for which is the user indicated by the recipient identification information included in that search instruction. The range of search is that image processing apparatus 20 and the external image processing apparatuses 20a and 20b connected via the network, and is that entire image processing system 10.

The search result output section 45 outputs the result of search carried out by the searching section 44 according to the search instruction. In particular, when the concerned image data has been detected, the specific information (predetermined item) related to the detected image data is output as the search result to the device transmitting the search instruction.

The specific information related to the image data comprises, for example, the information identifying the job related to that image data, the file name of that image data, its storage location, and the recipient identification information associated with that information etc. Although, it is sufficient if at least one of these is included in the specific information output as the search result, it is desirable that two or more of these are included.

Further, the search result can be output using the display section 24 used as the destination by the image data output section 31, the image forming section 29, or the network connection section 26 etc. Further, it is also possible to output simultaneously the search result and the image data.

The output instruction section 46 carries out the function of selecting the image data that is to be output based on the received search result. In addition, it also has function of transmitting the output instruction for the selected image data to the device transmitting the earlier search result. Specifically, simultaneously with displaying the search result in the display section 24, the operation of selecting the image data to be output is received from the user via the operation section 25, and the output instruction is transmitted taking this selected image data as the target.

Further, although the different functions of the image processing apparatus 20 have been explained assuming that it is connected to the image processing system 10, the configuration is such that the functions can be realized even when not connected to the image processing system 10. For example, instead of transmitting to an external device the search instruction, the search result, and the output instruction etc., it is also possible to complete the operations from image data registration up to output instruction by carrying out data transmission and reception between the different section within the same image processing apparatus 20. Further, hereafter, whenever there is an explanation that an instruction is transmitted to the same apparatus, it implies that the function is realized by carrying out data transmission and reception within the same apparatus.

Figure 3:
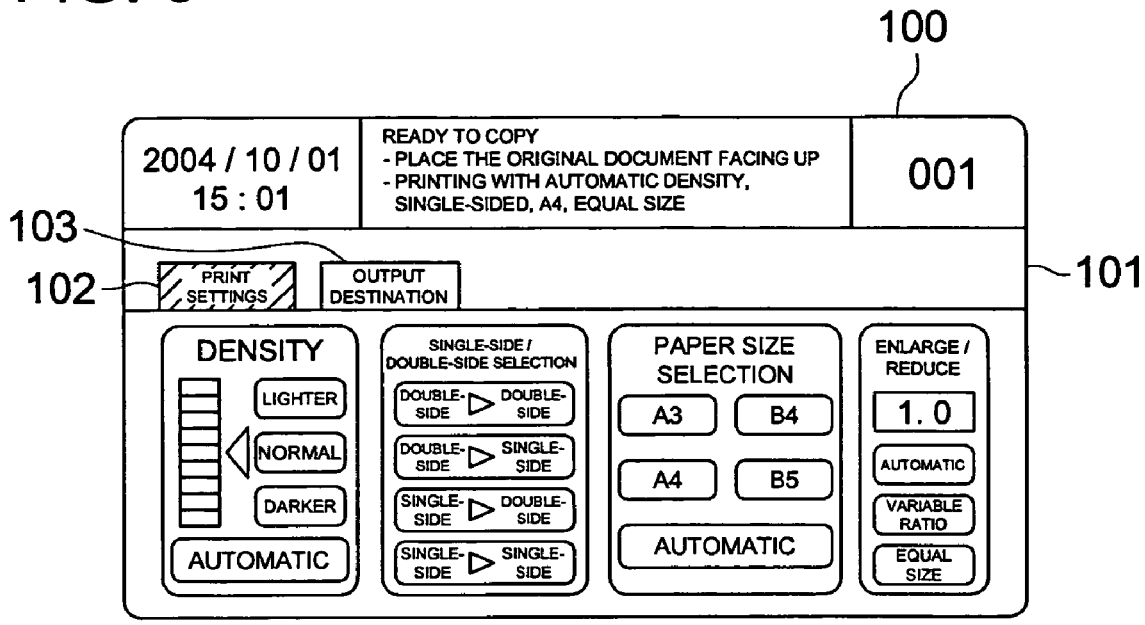
FIG. 3: This is an explanatory diagram showing an example of the print settings screen displayed in the display section of the image processing apparatus.

Next, the screen for setting the recipient of the image data is described here. FIG. 3 shows an example of the print settings screen 100 displayed in the display section 24 at the time of reading image data.

A display selection column 101 is displayed in the print settings screen 100, and the print settings tab 102 and the output destination tab 103 are displayed in the display selection column 101. The print settings screen 100 is a standby screen and the copy mode is started when the START button is pressed in this state, and the output destination of the read image can be selected by selecting the output destination tab 103. Further the tab corresponding to the currently displayed screen is displayed in color (filled with slant lines in the figure).

Figure 4:
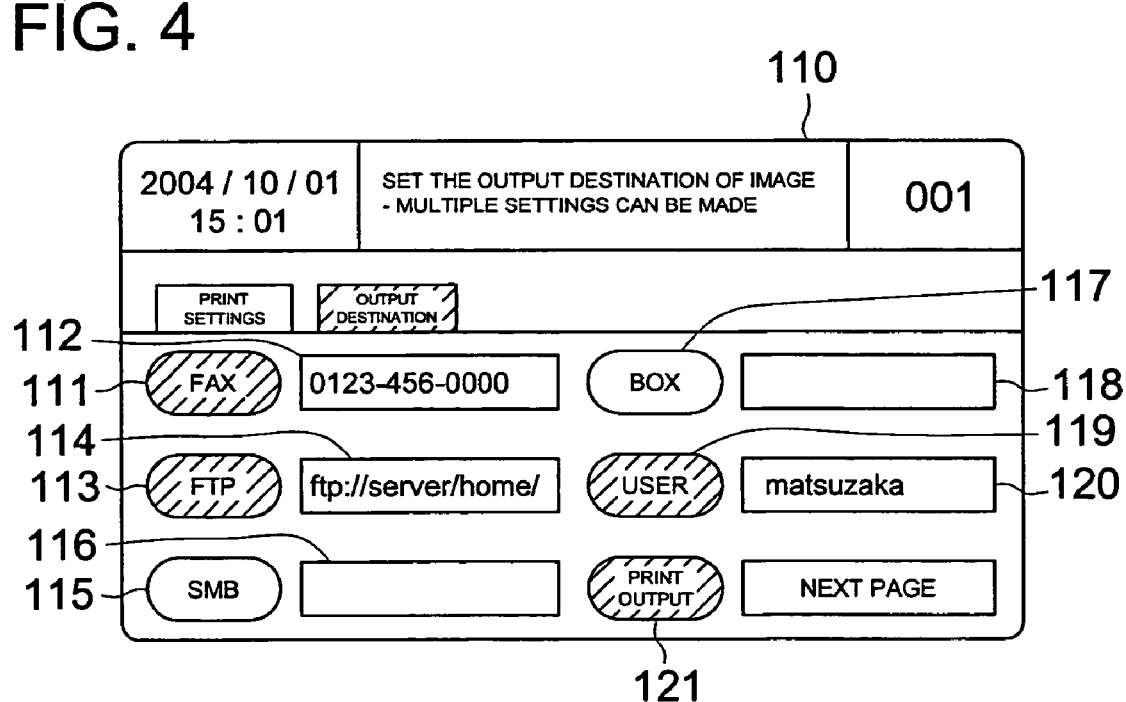
FIG. 4: This is an explanatory diagram showing an example of the output destination settings screen displayed in the display section of the image processing apparatus.

FIG. 4 shows an example of the output destination setting screen 110 displayed in the display section 24 when the output destination tab 103 has been selected in FIG. 3.

The facsimile button 111 has the function of setting the facsimile as the output destination and the destination facsimile number is input in the facsimile column 112. The FTP (File Transfer Protocol) button 113 has the function of setting the FTP server as the output destination, and the FTP address of the destination is input in the FTP column 114. The SMB (Server Message Block) button 115 has the function of setting the common folder on the network as the destination and the destination common folder on the network is input in the SMB column 116. The box button 117 has the function of setting the storage box within the image processing apparatus as the destination and information identifying the destination storage box is input in the box column 118. The user button 119 is an operation button for setting the recipient as the destination of image data and the user column 120 is the input field for entering the recipient identification information indicating the recipient of the image data. Here, the user name is input as the recipient identification information. Further, the print output button 121 is the operation button for setting image forming section 29 as the output destination of the image data.

It is possible to select multiple output destinations and the button of the selected output destination is displayed with a different color (filled with slant lines in the figure). FIG. 4 shows the condition in which a facsimile equipment, the FTP server, an user (recipient), and the image forming section 29 have been selected as the destinations of image data output. Here, the recipient identification information (user identification information) as the destination address is different from the information of the storage location or storage terminal of the image data and is the information identifying the user or the recipient of the image data. For example, it is sufficient if this is the name, nickname, organization name, designation name, facial photograph or cartoon of the user or the recipient and is the information with which it is possible to identify the user or the recipient.

Next, the input window whose popup display is made for setting the recipient identification information (user identification information) as the destination address is described here for the case when the user button 119 is selected in the output destination screen 110. The input window performs the role of a recipient input section 32. However, this input window is of two kinds of which one is that of inputting the user name directly and the other is that of inputting the user name by selecting from a list of previously registered user names.

When a registered user name can be obtained, the latter input window is displayed on a priority basis, and the former input window is displayed when a registered user name is not present.

Figure 5:
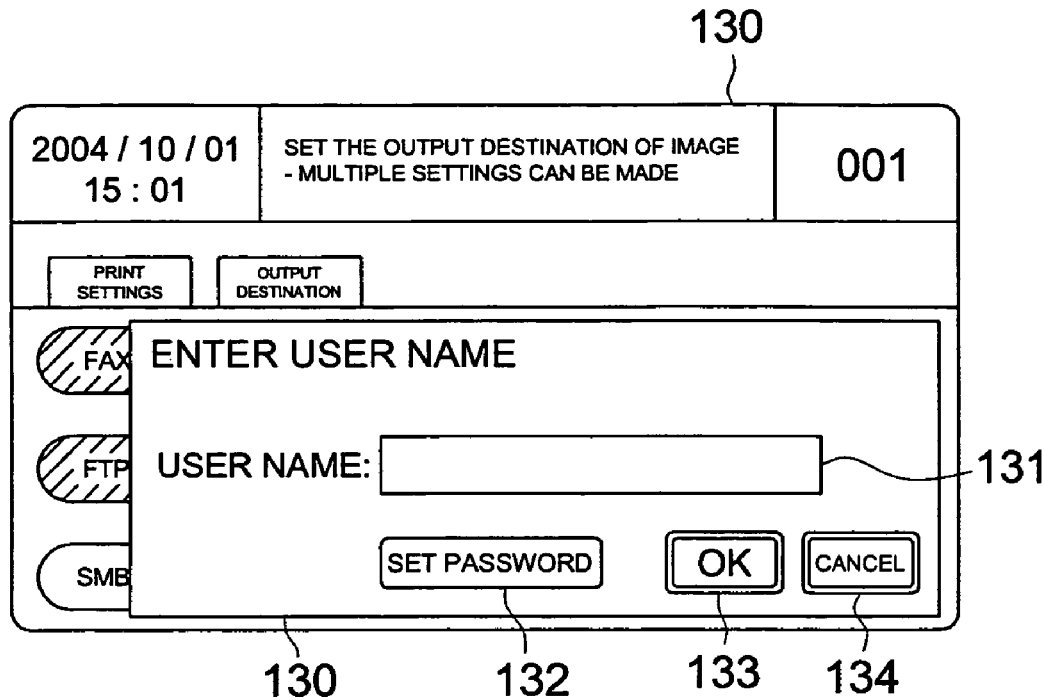
FIG. 5: This is an explanatory diagram showing an example of the recipient inputting window displayed in the display section of the image processing apparatus.

FIG. 5 shows an example of the recipient input window 130 of the direct user name input type.

The recipient input window 130 displays the recipient input column 131 for entering the recipient identification information, the password setting button 132 for displaying the screen for setting the password for authenticating the recipient identification information that has been input, the OK button 133 for confirming the contents input in the recipient input window 130 and the cancel button 134 for canceling the operation. The recipient input column 131 is configured so that characters etc., can be input using the operation section 25 not shown in the figure.

Figure 6:
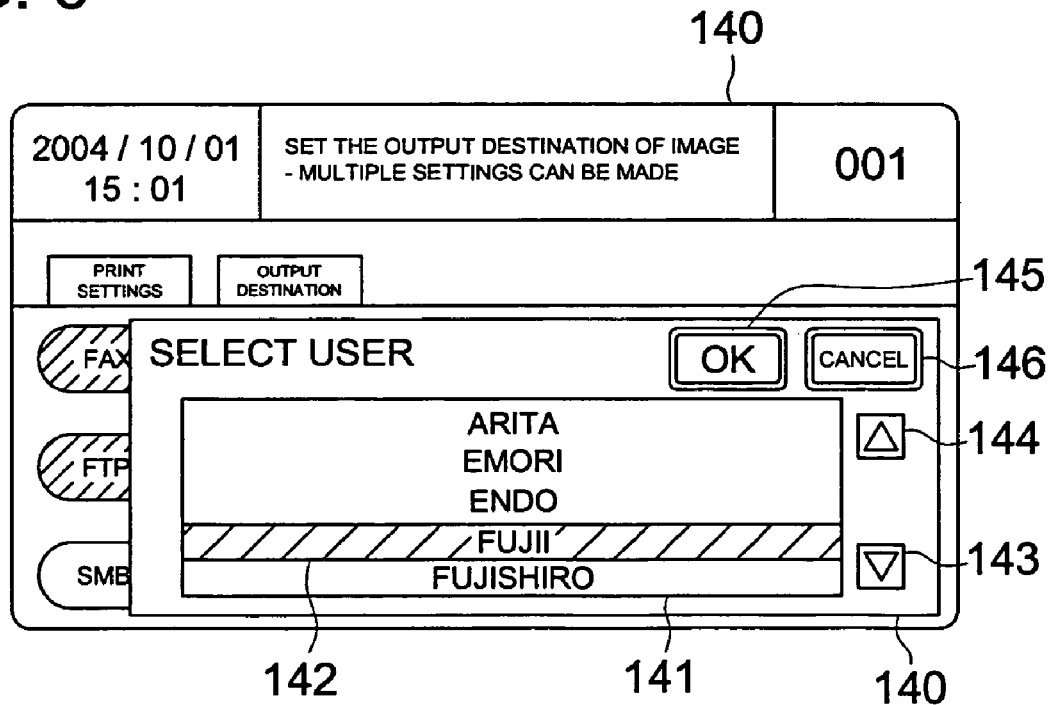
FIG. 6: This is an explanatory diagram showing an example of the recipient selection window displayed in the display section of the image processing apparatus.

FIG. 6 shows an example of the recipient selection window 140 of the type of selecting the user name from a list. The recipient selection window 140 is displayed in the case when it is possible to obtain the information of users who are potential recipients from a specific storage area for user registration. This storage area can be in the storage device processed by the image processing apparatus 20 or in a server connected to the network 11.

The recipient selection window 140 displays the recipient list column 141 displaying a list of user names, the reversed display area 142 which carries out reversed display of the line of the user name selected in the recipient list column 141, the downward movement button 143 and the upward movement button 144 for moving down or up the reversed display area 142 within the recipient list column 141, the OK button 145 confirming the user of the selected user name as the recipient, and the cancel button 146 for canceling the operation.

Further, when wanting to set an unregistered user as the recipient, although not shown in the figure, select the character string "Directly enter the user name" displayed at the beginning of the recipient list column 141. When this is done, a popup display is made of the recipient input window 130 of the direct user name input type.

FIG. 7 shows an example of the control table 200 which is used at the time the job management section 42 manages the job by establishing correspondence between the storage location of image data and the recipient identification information as the job attributes information.

A job number allocated for uniquely identifying each job is registered in the job number column 201 of the control table 200. Information indicating the storage location of image data related to each job is registered in the image data storage location column 202. The recipient identification information entered in the recipient input column 131 is registered in the output destination user name column 203. The file name for identifying the image data stored in the storage location is registered in the file name column 204.

Figure 8:
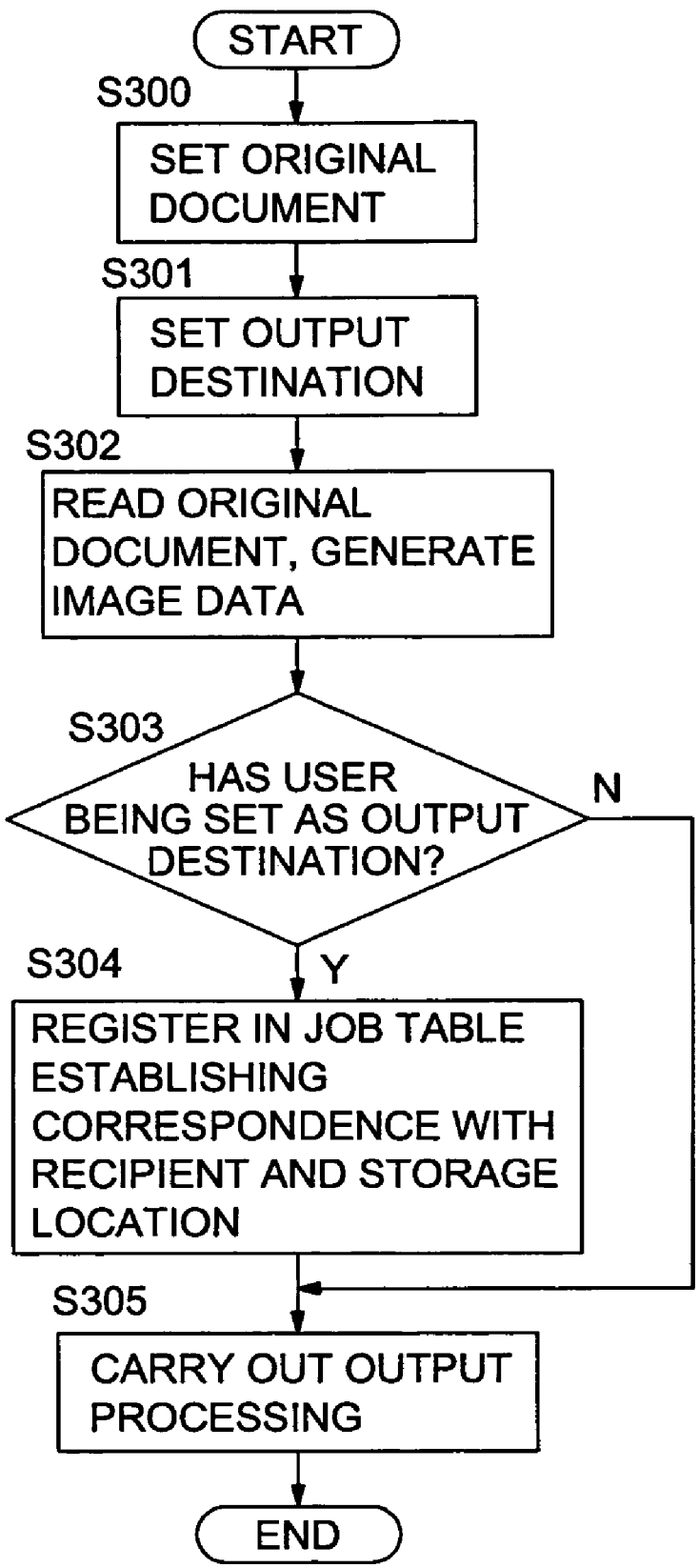
FIG. 8: This is a flow diagram showing the processing of reading the original document and storing the image data in the image processing apparatus.

FIG. 8 shows the flow of processing of reading the original document and storing the image data in the image processing apparatus 20.

The user sets the original document in the image processing apparatus 20 (Step S300), operates further the output destination setting screen 110 thereby setting the output destination of the original document to be read out (Step S301). The image processing apparatus 20 obtains the setting information of the output destination from the output destination setting screen 110. Next, the original document is read by the image reading section 30, after which the image data is generated (Step S302) and stored. Next a judgment is made as to whether or not the recipient identification information has been set in the setting information of the output destination that has been obtained earlier (Step S303).

If the recipient identification information has been set in the output destination (Step S303: Y), the recipient identification information that has been set is registered in the control table 200 associated with the storage location of the image data and the job number (Step S304).

Either after Step S304 or if a user has not been set in the output destination (Step S303: N), the outputting of the image data is made to the output destinations other than the user among the output destinations set in the output destination setting screen 110 (Step S305) and the processing is terminated (End).

Because of this, the user can send or receive image data to or from any desired other user without having to be aware of the storage location or file name of the image data by merely selecting the user and entering the recipient identification information as the output destination of image data in the output destination setting screen 110 similar to a facsimile equipment or an FTP server. In addition, since there is no hierarchical structure such as a storage box, there is no need for selection operations of several times such as specifying the terminal name and then specifying the box name, it is possible to send or receive image data using simple operations.

Next, the flow of operations at the time of searching for image data addressed to that user and the screen displayed at that time in the display section 24 are described here.

Figure 9:
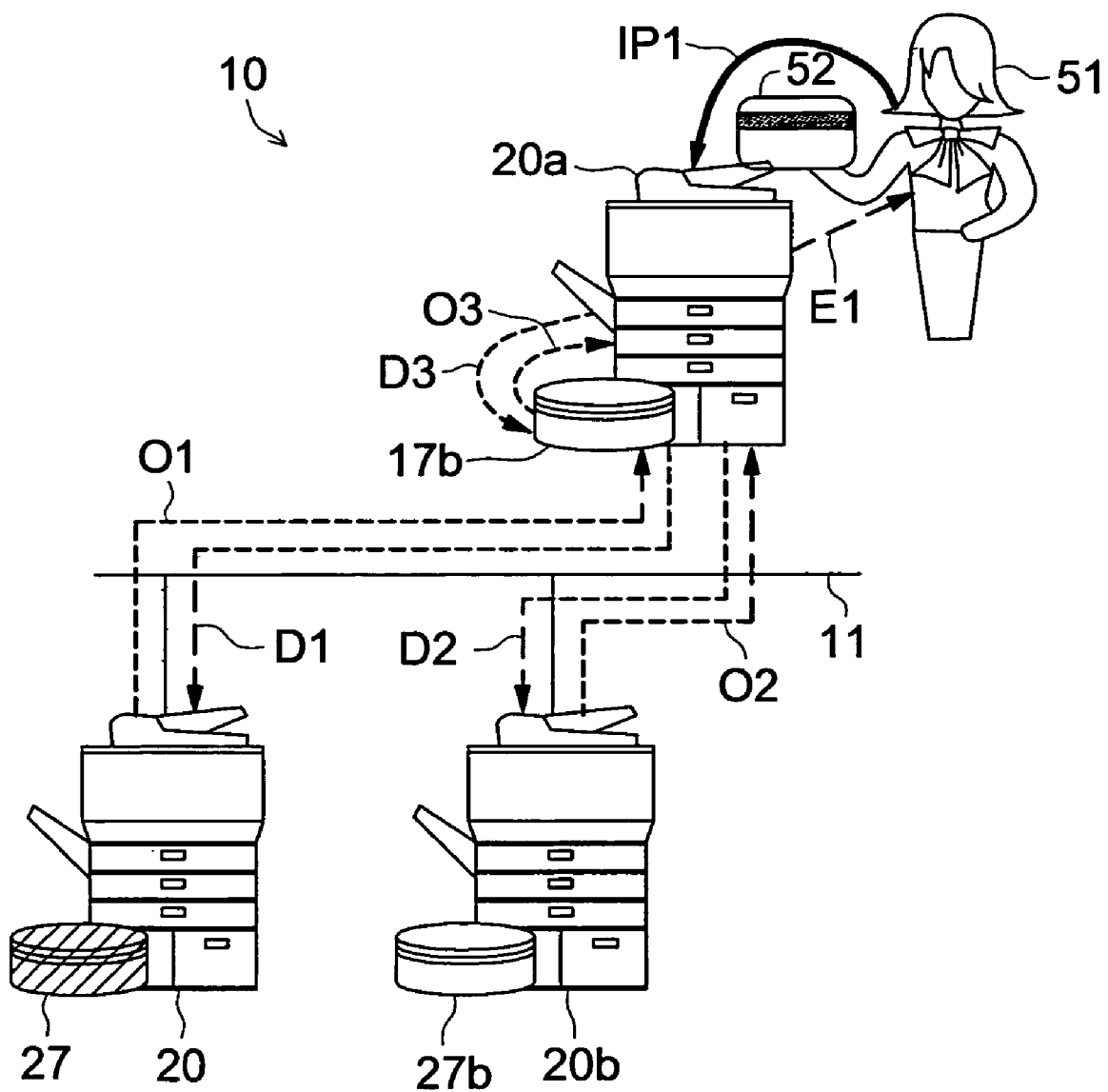
FIG. 9: This is an explanatory diagram showing the operation of searching for the presence or absence of image data associated with the user in an image processing system.

FIG. 9 shows the flow of operations of searching for image data addressed to that user 51 in the image processing system 10. The example shown in this figure is one in which image data for which the user 51 has been set as the recipient has been registered in the image processing apparatus and has been stored in its image storage section 27. In FIG. 9, the image storage section 27 has been filled with slant lines so as to identify it.

The user 51 enters in the search information input section 33 the recipient identification information used during the search for the image data (Input IP1). The method of inputting ID can be the method of inputting the user ID and password using the operation section 25 or the method of reading the recipient identification information from a medium (In this case, the ID (Identification) card 52) in which the recipient identification information has been recorded. Further, this input of recipient identification information (user identification information) can also be done using the operation panel provided in the image processing apparatus, or can be done using some other image processing apparatus or an external device connected to the image processing apparatus via the network, and the hence the inputting method can be anything. Even the search for image data can be done from the image processing apparatus through which the image data was registered or can be done through some other image processing apparatus or an external device connected to the image processing apparatus via the network.

The user 51 is authenticated based on the recipient identification information input during the step Input IP1. Next, the image processing apparatus 20a transmits the search instruction for the image data whose destination address is the user 51 to all image processing apparatuses 20, 20a, and 20b connected to that image processing system including that image processing apparatus (Instruction D1, D2, D3).

The search section 44 of the image processing apparatuses 20 and 20b that has received the search instruction searches within each device, and if an appropriate image data is detected, the search result output section 45 of that image processing apparatus outputs the search result to the image processing apparatus 20a (Output O1, O2). In addition, the search result output section 45 of the image processing apparatus 20a collects the search result within the apparatus (Output O3). Further, it is possible to display separately Output O1 through Output O3 which are search results from individual image processing apparatuses, or else, they can be displayed as a common list.

The image processing apparatus 20a receives the search result, and based on that, reports by displaying in the display section 24 the image data for which the user 51 has been set as the recipient (Display E1).

Further, in the example shown, although the search instruction was transmitted to all image processing apparatuses connected to the network 11, for example, it is possible to control centrally in a specific image processing apparatus within the image processing system 10 the information associating the storage location and the recipient identification information of image data for which the recipient has been set, and to obtain the search result by transmitting the search instruction to this specific image processing apparatus thereby obtaining the search result. Because of this, it is possible to reduce the load on the network 11 due to transmitting several search instructions.

Figure 10:
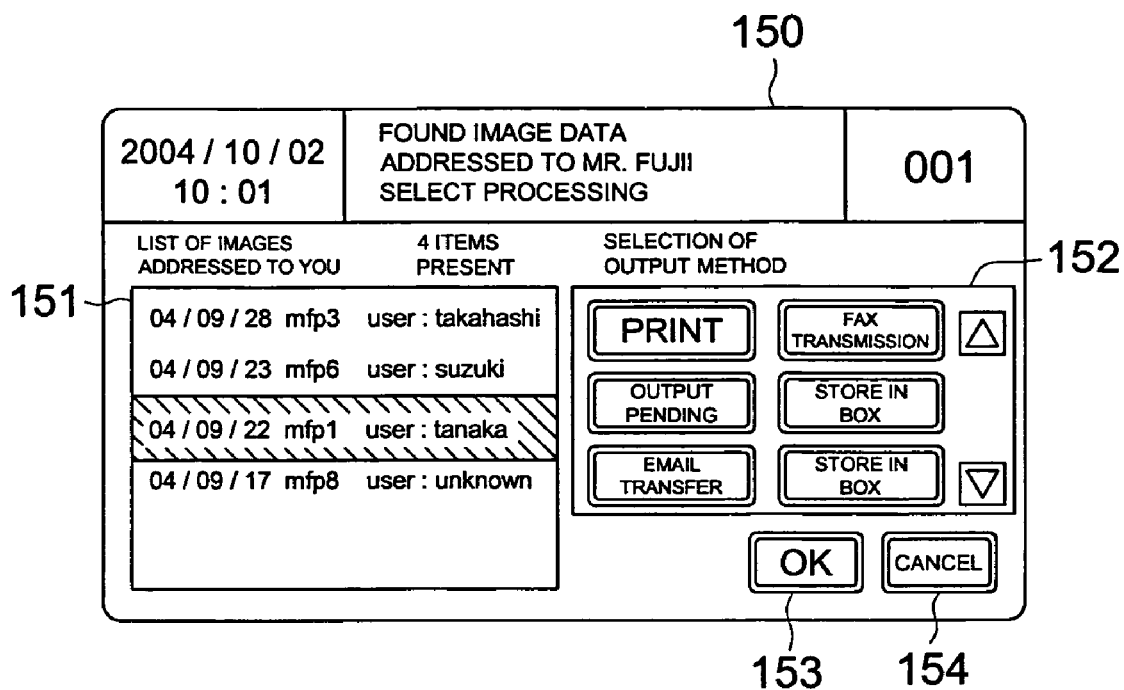
FIG. 10: This is an explanatory diagram showing an example of the output instruction screen displayed in the display section of the image processing apparatus.

FIG. 10 displays the above search result and shows an example of the output instruction screen 150 that receives the selection operation of the image data that is desired to be output from among the search result. The output instruction screen 150 performs the role of the output instruction section 46. Further, the operation of displaying the output instruction screen 150 corresponds to Display E1 in FIG. 9.

The output instruction screen 150 includes the display of the search result display column 151 that displays a specific information (predetermined item) related to the image data for which the user 51 has been set as the recipient, the output method selection column 152 for selecting the method of outputting the image data, the OK button 153 for confirming the image data to be output and the output method, and the CANCEL button 154 for canceling the operation.

The specific information displayed in the search result display column 151 includes the date and time of storing the image data, the location where the image data is stored, and the information of the user who stored the image data, etc. The user 51 selects one or more image data desired to be output based on the specific information displayed in the search result display column 151. Further, the user also selects or more output methods for outputting these image data from among the output destinations present in the output method selection column 152. Also, after selecting each output destination, it is necessary to input the address or the box number for individually identifying the output destination. When the OK button 153 is pressed, the selection operations made up to that point are confirmed, and an output instruction for outputting the selected image data to the selected output destination using the selected output method is transmitted to the image processing apparatus detecting each of the selected image data.

Further, when the output method of "Print" is selected, it is possible to select the image processing apparatus in which the image data is to be printed out from a detailed selection screen not shown in the figure. For example, it is possible to select as the printing apparatus the image processing apparatus which authenticated the user 51 or the image processing apparatus in which the image data was registered, etc.

Figure 11:
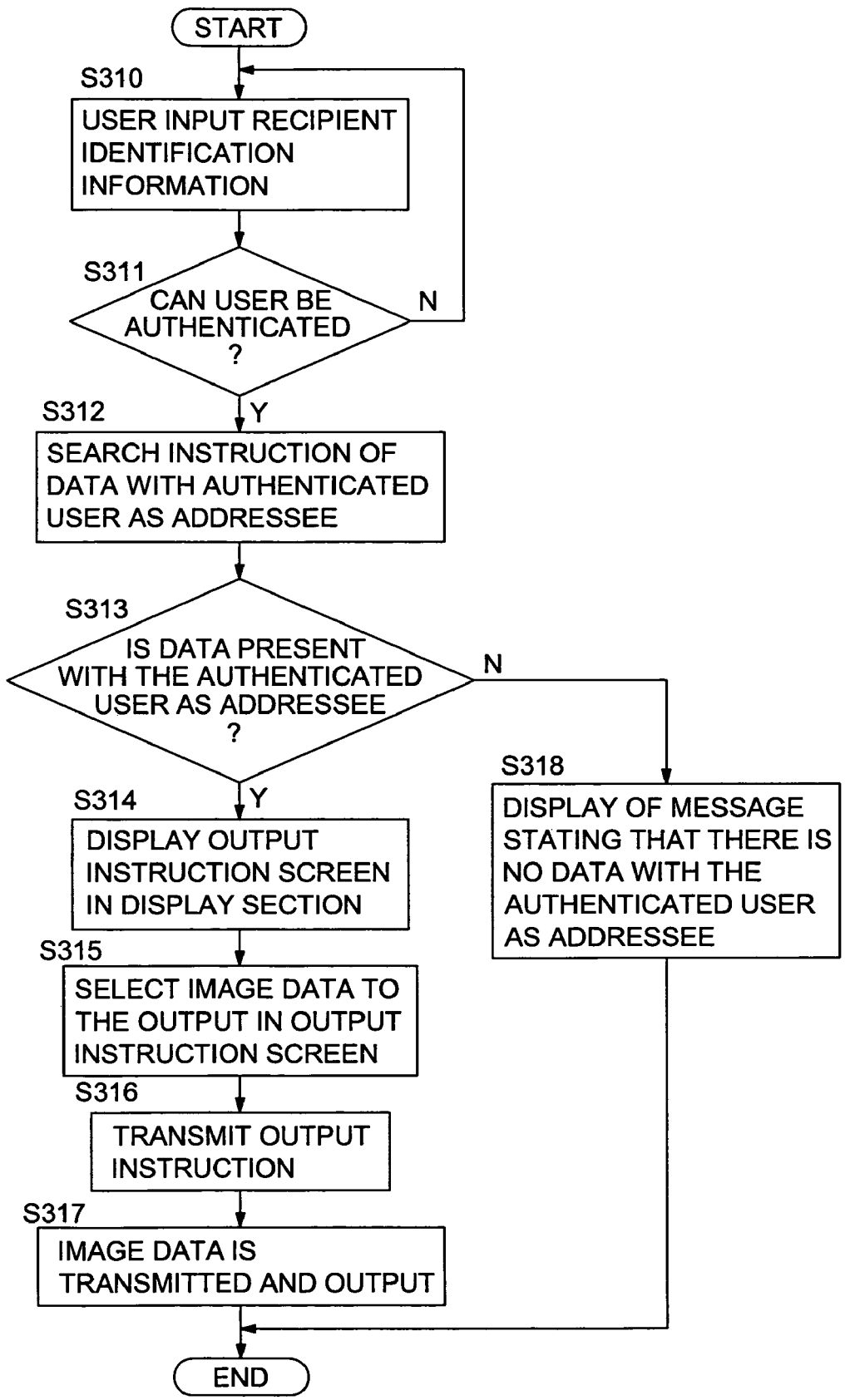
FIG. 11: This is a flow diagram showing the processing of searching for and outputting the image data associated with an authorized user as the recipient.

FIG. 11 shows the flow of operations of searching and outputting the image data using the recipient identification information.

The user inputs the recipient identification information using the search information input section 33 of the image processing apparatus 20a (Step S310). The search information input section 33 authenticates the user based on the recipient identification information and the authentication information that has been input (Step S311). When the user could not be authenticated (Step S311: N), the input of the recipient identification information is requested for again (Step S310). If the user could be authenticated (Step S311:Y), a search instruction is sent to all image processing apparatuses in the image processing system 10 to search for the image data for which the authenticated user is the recipient (addressee) (Step S312).

Each image processing apparatus that has received the search instruction searches whether or not an image data has been registered in that apparatus for which the above authenticated user has been set as a recipient, transmits the search result to the image processing apparatus 20a which is the source of the search instruction, and the image processing apparatus transmitting the search instruction receives the search result from image processing apparatus. Next, if an image data is detected for which the user authenticated earlier has been set as the recipient (addressee) (Step S313: Y), the specific information related to the detected image data is displayed as a list in the output instruction screen 150 (Step S314).

Based on the information displayed in this output instruction screen 150, the user selects the image data to be output and its output method (including the detailed output destination) (Step S315). For each of the selected image data, the output instruction section 46 transmits the output instruction related to that image data to the image processing apparatus where that image data was detected (Step S316). Each image processing apparatus receiving an output instruction outputs that image data specified in that output instruction to the output destination specified in that output instruction using the output method specified in that output instruction. When the output destination is another image processing apparatus, that image data is transmitted to that image processing apparatus. For example, when the output method is "Print", a print request of that image data is also transmitted to the image processing apparatus to which the image data has to be transmitted. After the image data is output in this manner (Step S317), the processing is terminated (End).

Further, when no image data is detected for which the authenticated user is the addressee (Step S313: N), this fact is displayed in the display section 24 (Step S318), and the processing is terminated (End).

Because of this, the user can search for image data addressed to oneself that is present in the image processing system 10 by merely entering the user's own recipient identification information, and it is possible to receive and output the image data easily without having to specify its storage location or file name. In addition, since the user is authenticated in the search information input section 33, it is not possible to take out the image data when some other person fakes the recipient identification information and hence security is maintained.

Figure 12:
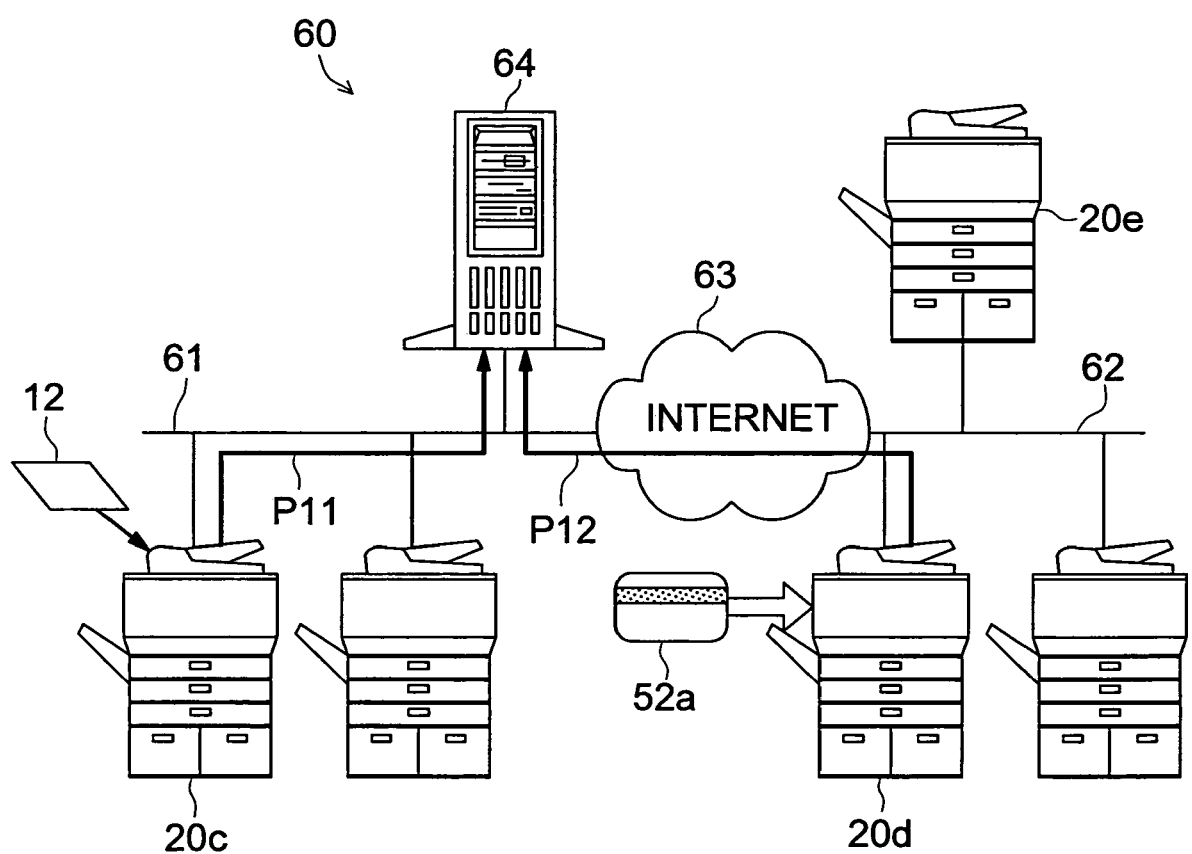
FIG. 12: This is an explanatory diagram showing the configuration of the image processing system according to a second preferred embodiment of the present invention and the flow of processing in that image processing system.

FIG. 12 shows the system configuration of the image processing system 60 related to the second preferred embodiment of the present invention and the flow of data in the image processing system 60. While the image data was registered and managed in the image processing apparatus 20 in the first preferred embodiment, a server 64 is provided in the present preferred embodiment and the configuration is such that the registration and management is carried out in this server.

The image processing system 60 is connected to a network 61 constituted by a LAN, to a network 62 and the Internet 63. The image processing apparatus 20c and the server 64 carries out management of various types of data are connected to the network 61, and the image processing apparatuses 20d and 20e are connected to the network 62. The mechanical configurations of the image processing apparatuses 20c, 20d, and 20e are identical.

Further, the configurations of the image processing apparatuses 20c, 20d, and 20e in the second preferred embodiment are almost identical to the configuration of the image processing apparatus 20 in the first preferred embodiment excepting for the following points of difference. In order to register the image data in the server 64, the registration is done in the job control section possessed by the server 64. The method of this registration can be, either directly registering the job from the image processing apparatus in server, or a registration request can be sent from the job control section 42 possessed by the image processing apparatus to the server 64. Further, since the search function has been realized in the server 64, the search section 44 and the search result output section 45 are not necessary in the image processing apparatuses 20c, 20d, and 20e.

On the other hand, the server 64 has the function of registering image data while establishing correspondence with the recipient identification information based upon registration request from the image processing apparatuses 20c, 20d, and 20e, and the function of searching for the image data based on a search instruction from the image processing apparatuses 20c, 20d, and 20e and returning that search result. Specifically, the functions related to registration are explained in this figure and functions related to searching are explained in FIG. 13.

In the image processing system 60, the image data and the information related to the image data such as the recipient identification information are transmitted to the server 64 (Path P11). The server 64 performs the role of registering and managing the image data based on the image data and information transmitted to it. Specifically, the image data is managed using a control table which establishes the correspondence between the information identifying the image data, the recipient identification information, and the storage location within the server 64.

In addition, the server 64 not only performs the role of managing the image data but also performs the role of managing the information related to user authentication. For example, the correspondence relationships between the user names and passwords are managed, and when the recipient identification information from the search information input section 33 of the image processing apparatus in the image processing system 60 is input in the format of user name and password, the server performs the role of providing to the search information search section the information judging whether or not it is appropriate.

The information related to authentication can be registered from the image processing apparatus 20d using the path indicated by Path P12. For example, it is possible to register information establishing the correspondence between the user names and passwords, or information establishing the correspondence between the ID card 52a and the user names.

Further, although the image data was transmitted directly to the server 64 in Path P11, it is also possible to store the image data in the image storage section 27c of the image processing apparatus 20c, and to transmit to the server 64 the information establishing correspondences among the identification information of that image data, its storage location, and the recipient identification information. The server 64 manages the image data using a control table based on that information.

Further, the information related to the image data can be registered in the server 64 using the Path 12, or else the information related to user authentication can be registered in the server 64 using the Path 11. As long as the information can be managed by the server 64, that information can be registered in the server 64 from any of the image processing apparatuses 20c, 20d, and 20e. Any of the image processing apparatuses 20c, 20d, and 20e can be used as an information registering terminal for the server 64, and the information registration can be realized easily even if the server 64 is at a remote location.

Figure 13:
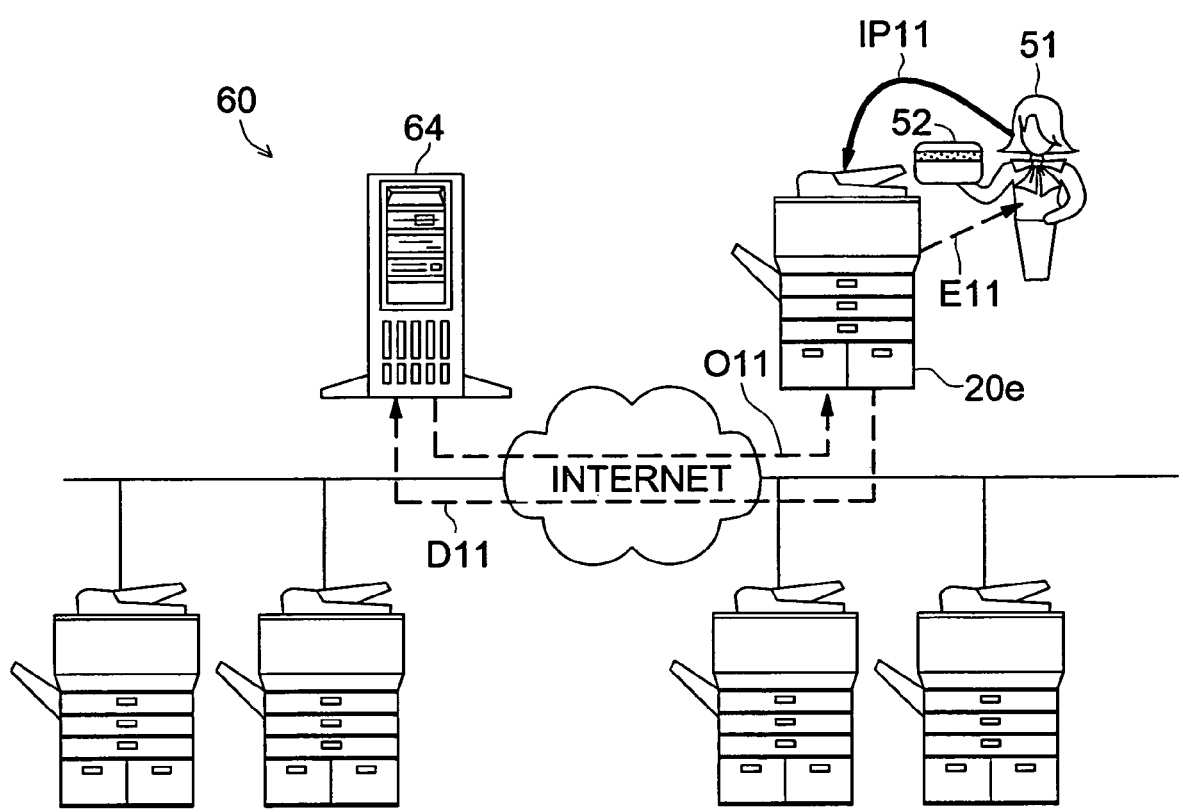
FIG. 13: This is an explanatory diagram showing the flow of processing in the case of searching for and outputting the image data in the image processing system according to a second preferred embodiment of the present invention.

FIG. 13 shows the flow of data at the time of searching and outputting image data managed by the server 64 in the image processing system 60.

The image processing apparatus 20e inputs via the search information input section 33 the recipient identification information of the user 51 used for the search. For example, the user name and password are input from the operation section 25, or can be input from an ID card 52 etc., (Input IP11). The search instruction of the image data based on the recipient identification information that has been input is transmitted to the server 64 (Instruction D11). The server 64 carries out authentication of the user 51 based on the recipient identification information transmitted to it. Next, the image data for which the authenticated user has been set as the recipient is searched, and the result of the search is output to the image processing apparatus 20c (Output O11).

The image processing apparatus 20e displays the output instruction screen 150 in the display section 24 based on the received search result (Display E11). The user selects the image data to be output from the output instruction screen 150. The output instruction section 46 transmits to the server 64 the output instruction of image data selected by the user 51, and the server 64 outputs to the image processing apparatus 20e the image data selected according to that output instruction.

By using such an image processing system 60, it is possible to carry out centralized management of the image data by the server 64. Therefore, there is no need to issue search instructions respectively to each image processing apparatus within the image processing system 60, and the exchange of these search instructions and the search results corresponding to these search instructions becomes simplified. As a consequence, it is possible to reduce load of the traffic over the network.

Further, there is an option called "omit output of search result" at the time of transmitting the search instruction to the server 64. If this option is selected, the search instruction simultaneously becomes also the output instruction, and when a concerned image data is detected by the server, the detected image data is output to the apparatus transmitting the search request without transmitting the search result. In addition, the configuration can be made so that the selection operation of the output method or of the output destination is accepted before issuing the search instruction, and the information specifying the output method and the output destination of the searched image data is also sent along with the search instruction. In this case, the server 64 transmits the searched image data according to the specification of the output method and output destination received along with the search instruction.

Such an option of omitting the outputting of the search result can also be used in the first preferred embodiment. Because of this, it is possible to reduce the number of times of sending and receiving data, and to output the image data addressed to oneself more quickly.

In the above, although some preferred embodiments of the present invention were described with reference to figures, the concrete configuration need not be limited to those shown in the preferred embodiments, and even modifications or additions not exceeding the intent and scope of the present invention shall also be deemed to be included in the present invention.

Furthermore, although only one recipient was set as the output destination in the preferred embodiments above, it is possible to set a plurality of recipients as the output destinations. Because of this, it is possible to send or receive the same image data to a plurality of persons. Also, when the image data is registered by specifying a group name such as an organization name or a designation name as the recipient, it is possible to search the image data with that group name, and also, each user belonging to that group can search for the image data for which the recipient is that group name.

Further, in the first preferred embodiment, although the search for an image data was being done by one image processing apparatus transmitting the search instruction to other image processing apparatuses, it is also possible that the search instruction is not transmitted but the image processing apparatus directly accesses the image storage section of other image processing apparatuses and searches for the image data. For example, by providing a directly accessing search function in some specific apparatus within the image processing system, it is not necessary for other apparatuses to be provided with the search function because they can request the above specific apparatus to carry out the search. As a result, it is possible to simplify the configuration of image processing apparatus and to suppress the cost.

Further, in the preferred embodiments, although the input of the recipient identification information was being done using an ID card 52 in the search information input section 33, or using the input of user ID and password through the operation section 25, for example, an image recognition function can be installed in the image processing apparatus, and it is possible to use the method of inputting the recipient identification information by photographing the user's face and authenticating the user based on that photograph. Because of this, the user can input the recipient identification information and carry out authentication without having to make special operations.

Further, although the user name was being displayed in the recipient list column 141, it is also possible to display facial photographs or cartoons or nicknames etc., indicating the recipients and to input the recipient identification information by selecting from them. It is possible to recognize and select the recipient user visually and intuitively.

Further, although in the preferred embodiments, establishing the correspondence between the recipient identification information and image data was being done using a control table 200, it is possible, for example, to maintain the correspondence with image data by creating a folder in which the recipient identification information can be identified and placing the image data in that folder, or to add the file name or attribute information etc., of the image data to the recipient identification information. Because of this, it is possible to carry out searches of image data without maintaining a special management table.

Further, in the preferred embodiments, although the search result was being displayed in the display section 24 as the output instruction section 150, the location of display need not be restricted to the display section 24, and the display can be made in a computer or another device connected to the network 11. In addition, it is also possible to issue the output instruction from that apparatus making the display. Because of this, the user does not have to make the operation after moving to the image processing apparatus thereby increasing the convenience of the user.

Further, in the preferred embodiments, although the transfer of the search instructions or search results were being made by exchange of data between image processing apparatuses, if the image processing system is in an environment capable of using email, it is also possible to transmit search instructions and search results as emails. In addition, it is also possible to post by email when an image data addressed to oneself has been registered. Because of this, the user can issue instructions to the image processing system by email, and also, can receive reports at any time from the image processing system.

Further, in the preferred embodiments, although the server carrying out registration and storage was the same as the server carrying out search, it is possible to have a server that carries out only searches or to have a server that carries out only registration and storage. Also, in a similar manner, even the image processing apparatuses can have only the search function or only the registration function. Because of this, it is possible to add an apparatus having the necessary function to the image processing system, and to extend the system according to the mode of usage of the system.

Further, in the preferred embodiments, although the input of the image data was being Made from the image reading section 30, it is also possible to input the image data from a terminal on the network.

According to each of the above configurations, the image data is registered while establishing correspondence with the user identification information or the recipient identification information, and the stored image data can be searched based on the user identification information or the recipient identification information. Because of this, each user can search and output the image data addressed to oneself without having to know the storage location or the file name of the image data.

Here, the user identification information or the recipient identification information is different from the information of storage location or the storage terminal of the image data and is the information for identifying the user or the recipient of the image data. For example, it is sufficient if this information enables the identification of the user or the recipient and can be the name, nickname, organization name, designation name, biometric information, facial photograph, cartoon, etc., of the user or the recipient.

In addition, it is also possible to carry out the input of this user identification information or recipient identification information from an operation panel provided in the image processing apparatus, or can be input from another image processing apparatus or an external device connected to the image processing apparatus via the network, and the input method can be anything. Even regarding the search of image data, the search can be made from the image processing apparatus used for registering the image data or can be made from another image processing apparatus or an external device connected to the image processing apparatus via the network.

Further, for each job, it is possible to carry out registration of the image data related to that job while establishing correspondence with the recipient identification information indicating the recipient of that image data and with the storage location of that image data.

Apart from carrying out the registration management of image data not only using the image processing apparatuses, it is also possible to register and manage using an external device such as a server connected to the network.

It is to be noted that various changes and modifications will be apparent to those skilled in the art. Therefore, unless such changes and modifications depart from the scope of the present invention, they should be construed as being included therein.

What is claimed is:

1. An image processing system, comprising:
a first image processing apparatus, and
a second image processing apparatus, wherein the first image processing apparatus and the second image processing apparatus are connected with each other via a network, wherein the first image processing apparatus includes a job registration section which registers an image data in each job;

a recipient information input section which inputs a recipient identification information representing a recipient for the image data; and a job management section which manages the recipient identification information in association with a storage location for the image data in each registered job, wherein the second image processing apparatus includes a search information input section which inputs a user identification information for search; and a search instruction transmitting section which transmits a search instruction including the recipient identification information for search to the first image processing apparatus, wherein the first image processing apparatus further includes a search information receiving section which receives the search instruction from the second image processing apparatus;

a search section which searches an image data associated with the recipient identification information matching the recipient identification information for the search in the search instruction; and a search result output section which outputs a predetermined item with regard to the image data searched by the search section in response to the search instruction, wherein the second image processing apparatus further includes an output instruction transmitting section which selects the image data based on the predetermined item received from the first image processing apparatus, and transmits a output instruction with regard to a selected image data to the first image processing apparatus, wherein the first image processing apparatus further includes an image data output section which outputs the image data in accordance with the output instruction from the second image processing apparatus.

2. The image processing system of claim 1, wherein the predetermined item outputted by the search result output section includes at least one of job identification information of the image data, a file name of the image data, the storage location for the image data and the recipient identification information for the image data.

3. The image processing system of claim 1, wherein the image data output section outputs the image data searched by the search section as a search result, while the search result output section does not output the predetermined item with regard to the image data.

4. The image processing system of claim 1, wherein the recipient identification information includes at least one of a user name, a nickname, a name of an organization, a name of an appointment and a facial portrait corresponding to a recipient for the image data.

5. The image processing system of claim 1, wherein the storage location is in at least one of the first image processing apparatus, an external device connected via a network, and a server connected via the network.

6. The image processing system of claim 1, wherein the search section searches an image data which is stored in an external device connected via a network.

7. The image processing system of claim 1, further comprising:

an authentication section which authenticates a recipient for the image data based on the user identification information inputted in the search information input section and an authentication information.

8. An image processing system, comprising:

a first image processing apparatus, and a second image processing apparatus, wherein the first image processing apparatus and the second image processing apparatus are connected with each other via a network, wherein the first image processing apparatus includes a job registration section which registers an image data in each job;

a recipient information input section which inputs a recipient identification information representing a recipient for the image data; and a job management section which manages the recipient identification information in association with a storage location for the image data in each registered job, wherein the second image processing apparatus includes a search information input section which inputs a user identification information for search; and a search instruction transmitting section which transmits a search instruction including the recipient identification information for search to the first image processing apparatus, wherein the first image processing apparatus further includes a search information receiving section which receives the search instruction from the second image processing apparatus;

a search section which searches an image data associated with the recipient identification information matching the recipient identification information for the search in the search instruction; and an image data output section which outputs the image data searched by the search section.

9. The image processing system of claim 8, wherein the recipient identification information includes at least one of a user name, a nickname, a name of an organization, a name of an appointment and a facial portrait corresponding to a recipient for the image data.

10. The image processing system of claim 8, wherein the storage location is in at least one of the first image processing apparatus, an external device connected via a network, and a server connected via the network.

11. The image processing system of claim 8, wherein the search section searches an image data which is stored in an external device connected via a network.

12. The image processing system of claim 8, further comprising:

an authentication section which authenticates a recipient for the image data based on the user identification information inputted in the search information input section and an authentication information.

* * * * *

UNITED STATES PATENT AND TRADEMARK OFFICE
CERTIFICATE OF CORRECTION

PATENT NO. : 7,630,586 B2  Page 1 of 1
APPLICATION NO. : 11/254865
DATED : December 8, 2009
INVENTOR(S) : Yasukaga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this

Second Day of November, 2010

David J. Kappos
*Director of the United States Patent and Trademark Office*